(12) United States Patent
Gagné

(10) Patent No.: US 6,353,437 B1
(45) Date of Patent: Mar. 5, 2002

(54) ANIMATION SYSTEM AND METHOD FOR DEFINING AND USING RULE-BASED GROUPS OF OBJECTS

(75) Inventor: Réjean Gagné, Montreal (CA)

(73) Assignee: Avid Technology, Inc., Tewksbury, MA (US)

( * ) Notice: Subject to any disclaimer, the term of this patent is extended or adjusted under 35 U.S.C. 154(b) by 0 days.

(21) Appl. No.: 09/086,467

(22) Filed: May 29, 1998

(51) Int. Cl.[7] .............................................. G06T 17/00
(52) U.S. Cl. ...................................................... 345/473
(58) Field of Search ................................ 345/422, 473, 345/474, 420, 421

(56) References Cited

U.S. PATENT DOCUMENTS

| | | | | |
|---|---|---|---|---|
| 5,592,609 A | * | 1/1997 | Suzuki et al. ................ | 345/473 |
| 5,649,086 A | * | 7/1997 | Belfer et al. ................. | 345/473 |
| 5,710,894 A | * | 1/1998 | Maulsby et al. ............. | 361/703 |
| 5,724,074 A | * | 3/1998 | Chainani et al. ............. | 345/474 |
| 5,764,241 A | * | 6/1998 | Elliott et al. ................. | 345/473 |
| 5,933,150 A | * | 8/1999 | Ngo et al. .................... | 345/473 |
| 5,982,390 A | * | 11/1999 | Stoneking et al. ........... | 345/474 |

FOREIGN PATENT DOCUMENTS

WO      WO96/13808      5/1996

\* cited by examiner

*Primary Examiner*—Cliff N. Vo
(74) *Attorney, Agent, or Firm*—Peter J. Gordon

(57) ABSTRACT

An animation system and method for defining and using one or more groups of objects in an animation allows an animator to define at least one membership rule that determines membership of an object in a group. Parameters such as properties, operators, effects, constraints, expressions and the like can be defined for the groups and can be inherited by each member of the group. A membership rule is evaluated at defined intervals to determine which objects in a scene satisfy the rule. The objects that satisfy the rule are included in the group defined by the membership rule. At least one parameter, selected by the animator for application to the group, is then inherited by each member of the group.

16 Claims, 5 Drawing Sheets

ANIMATION SYSTEM AND METHOD FOR DEFINING AND USING RULE-BASED GROUPS OF OBJECTS

FIELD OF THE INVENTION

The present invention relates to an animation system and method for defining and using rule-based groups of objects with such systems. More specifically, the present invention relates to an animation system and method for defining parameters to be inherited by groups of objects, the membership of objects in the groups being determined according to the evaluation of user-defined group membership rules at defined intervals.

BACKGROUND OF THE INVENTION

Computer animation systems are well known. Such systems permit users, such as animators or animation artists, to create and/or modify two-dimensional ("2D") and three-dimensional ("3D") computer and to reader the animations for viewing or for storage on a storage medium, such as video, film or disk.

Generally in advanced animation systems such as the Softimage|3D V3.7 product, sold by the assignee of the present invention are defined in terms of objects, such as animated 3D models of characters, geometric objects (such as NURBS surfaces, etc.), static backgrounds, lights and cameras and animation information (such as position versus time information), etc. In Softimage|3D V3.7, once an object has been modeled, an animator can associate one or more function curves, or F-curves, with the object to define parameters that are animated with respect to time, such as position, sealing, color, etc. The animator can modify the animation of the object by modifying the associated F-curves and having the computer re-compute the animation according to the modified F-curve. In addition, an animator can apply properties to an object, such as highlighting, and special effects such as jitter, etc. and can specify lights and cameras to be associated with a particular object.

As such animations can be tedious and/or time consuming to define, especially for complex animations with many objects, various attempts have been made to automate or simplify the definition of animation operations. In Softimage|3D V3.7, one manner in which to automatically animate objects and/or to apply pre-defined animation effects to object is to employ a "constraint" which comprises a mathematical and/or logical definition of animation parameters to be employed in the animation of the objects. Common constraints, such as position, orientation and scaling, am generally pre-defined in an animation application program and can simply be selected from a menu of available constraints.

When one or more appropriate constraints have been defined for various objects, the animation system updates and renders the frames of the animation according to the constraints defined by the animator, in combination with any other animation information explicitly defined for the animation, such as a motion path. For example, to create an animation where an array of parabolic antennas follow a satellite in Softimage|3D V3.7, an animator can select each of the antenna objects forming the array, and choose the "Constraint→Direction" command to constrain the z-axis of each antenna to point always at the center of the satellite as it moves across the sky by appropriately completing the dialog box which is presented to the animator. The use of constraints, either solely or in combination with other animation information, can provide a significant saving in animator time compared to conventional animation systems where all animation information must be explicitly defined.

Softimage|3D V3.7 also permits an animator to apply "expressions" to objects. Expressions are custom, or user-definable, constraints and, allow an animator to create complex behaviour by having an object, or set of objects, react automatically to parameters (i.e.—scaling, position, color, rotation, etc.) of another object. An expression is a mathematical and/or logical statement defining a relationship between any parameters of one, two, or more, objects. For example, an expression can be declared in an animation for a video game, such that the visibility of an object representing an enemy ("enemy") is dependent upon its proximity to an object representing the hero ("hero") of the game. To create the expression for the enemy object, the animator specifies the parameter to be affected by the constraint, in this case the "visible" parameter for the object representing the enemy:

visible=dist (enemy, hero)<5.

When the expression is false, i.e.—when the hero object is more or equal to 5 units from the position of the enemy object, the enemy object is not visible. When the expression is true, i.e.—the hero object is within 5 units of the position of the enemy object, the enemy object will become visible.

As computer animation systems have become more sophisticated, and hence complex, it has become desirable to provide animators with means to recall a selection of plurality of animation objects at one time. For repetitive tasks, or to quickly animate complex scenes, it is known to select two or more objects and to define them as a selection of items. This selection can have an alphanumeric or other meaningful tag assigned to it which allows a user to recall the selection of objects to easily identify the objects which the user has previously selected. For example, in Softimage|3D V3.7 "Select Mode", an animator can select two or more items in an animation, including objects and/or materials and define them as a selection with an appropriate tag such as "cubes". Then, wherever the user wishes to identify all of those previously selected items, the "cubes" selection can be selected to identify those item and desired effects, operators, constraints or expressions can be applied to the appropriate individual items within that selection.

While expressions and constraints provide animator's with powerful animation tools, they suffer from a lack of flexibility. For instance, in the example above, the expression for the visibility of the enemy object must individually and explicitly be applied by the user to each enemy object. If it is subsequently desired to modify the expression such that the specified comparison distance is changed from 5 to 7 units, (e.g. visible=dist(enemy, hero)<7) the expression defined for each respective object must be individually modified by the user. While a selection of the enemy objects may have been defined, to ease the task of identifying those objects whose expression must be changed, the user must still explicitly change the expression for each object. Further, if another enemy object is added to the animation, the user must remember to define an appropriate expression for the new object and to add that object to the defined selection of enemy objects.

It would be preferable to provide a flexible method and system which permits an animator to have greater control over the application of parameters such as properties, operators, effects, constraints and expressions to objects.

It is desired to have an animation system which permits animator to define parameters such as, properties, operators, effects, constraints and expressions which are automatically applied to or removed from objects in an animation according to rules defined by the animator.

SUMMARY OF THE INVENTION

It is an object of the present invention to provide a novel animation system and a method for defining and using one or more groups of objects which obviates or mitigates at least one of the above-mentioned disadvantages of the prior art. In particular, membership of an object in a group is determined according to a defined membership rule, and parameters such as properties, operators, effects, constraints, expressions and the like can be defined for the groups and inherited by each member of the group.

According to a first aspect of the present invention, there is provided a computer-implemented method of defining and using a group of animation objects for use in an animation including at least one object, wherein an animator defines at least one membership rule, which is used to determine the members of a group. The animator defines an interval, which can be a default interval, in the animation at which the membership rules of each group are evaluated for each animation object The animator further defines at least one parameter to be applied to each animation object which is determined to be a member of a group and the membership rules are evaluated, for each interval, to determine the animation objects do should be included within the group. For animation objects which are in the group, as determined by evaluating the membership rule, the parameter or parameters defined for the group are inherited by each animation object in the group. Animation objects which were in the group in the preceding interval, and which are not in the group in the current interval, drop all parameters inherited from the group and revert to their previously defined conditions.

According to another aspect of the present invention, there is provided an animation system to define and use rules-based groups of animation objects in an animation produced therewith. The system includes a storage device to store information defining animation objects and animation information relating thereto, at least one output device to display a graphical user interface to a user, at least one user input device to receive input from a user and a computer operatively connected to the storage device, output device and the user input device. The user of the system, with the user input device, defines at least one membership rule for a group of animation objects and can define at lean one parameter to be applied to the group defined by the membership rule. Once the membership rule is created, the computer determines when a defined interval has occurred for each defined membership rule of each group and evaluates the membership rule for each animation object in the animation. In many circumstances, the defined interval will be whenever a rerender/redraw event occurs, which can be after a user modification of the animation or when a new frame of the animation is to be rendered. In other circumstances the interval can be defined to be less frequent. Animation objects for which the membership rule is true are included in the group, until the next defined interval has passed, and inherit the parameters defined for the group. Animation objects no longer in the group, but which were in the group in the preceding interval, drop all parameters inherited from the group. The evaluation of the membership rules is repeated for each defined interval.

The present invention provides an animation system and method for defining and using groups of animation objects in an animation. A membership rule is created that defines the conditions for membership in the group. The rule is evaluated at defined intervals to determine which objects in a scene satisfy the rule, and these objects are included in the group. At least one parameter, selected by the animator for application to the group, is then inherited by each member of the group.

BRIEF DESCRIPTION OF THE DRAWINGS

Preferred embodiments of the present invention will now be described, by way of example only, with reference to the attached Figures, wherein.

DETAILED DESCRIPTION

In known computer-generated animation systems, each animation can consist of one or more animated scenes, where cub scene includes one or more animated 2D and/or 3D objects, static background elements, cameras and/or light sources.

Figure 1:
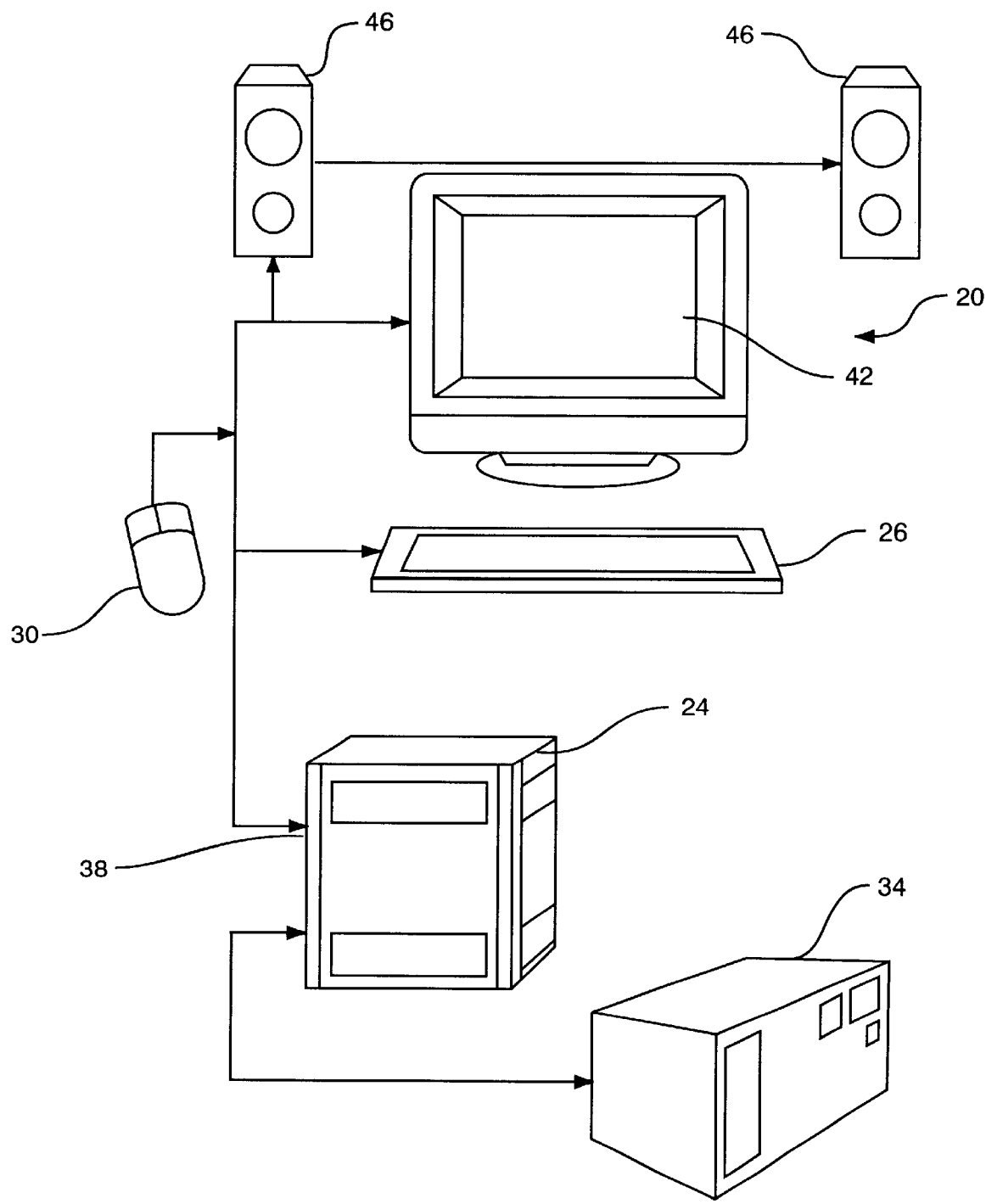
FIG. 1 shows a block diagram of an animation system in accordance with the present invention.

FIG. 1 shows an example of an animation system 20 for producing computer-generated animations in accordance with the present invention. System 20 includes a computer which, for example, can be a general purpose computer system 24 such as a personal computer with an Intel Pentium II processor and executing Microsoft Windows NT, or a special purpose computer system, and which executes one or more programs or software tools to create, modify and/or edit computer generated works. For example, computer 24 can execute the Softimage|3D V3.7 animation program sold by the assignee of the present invention. Computer system 24 is connected To one or more user input devices, such as keyboard 26, mouse 30, or any other suitable user input device such as a graphics tablet (not shown), etc. While computer system 24 will generally include a non-volatile storage device, additional data storage can be a provided by a storage device such as RAID array 34, optical disc drives (not shown), etc.

As will be apparent to those of skill in the art, computer system 24 can be directly connected to storage devices, such as RAID array 34, and/or be connected to storage devices via a suitable communications link, such as LAN network connection 38, etc. System 24 also includes one or more output devices, such as high resolution monitor 42 and stereo audio speakers 46. Workstation 20 can also be connected to one or more servers (not shown) or storage devices via LAN network connection 38, or other suitable communications link.

Figure 2:
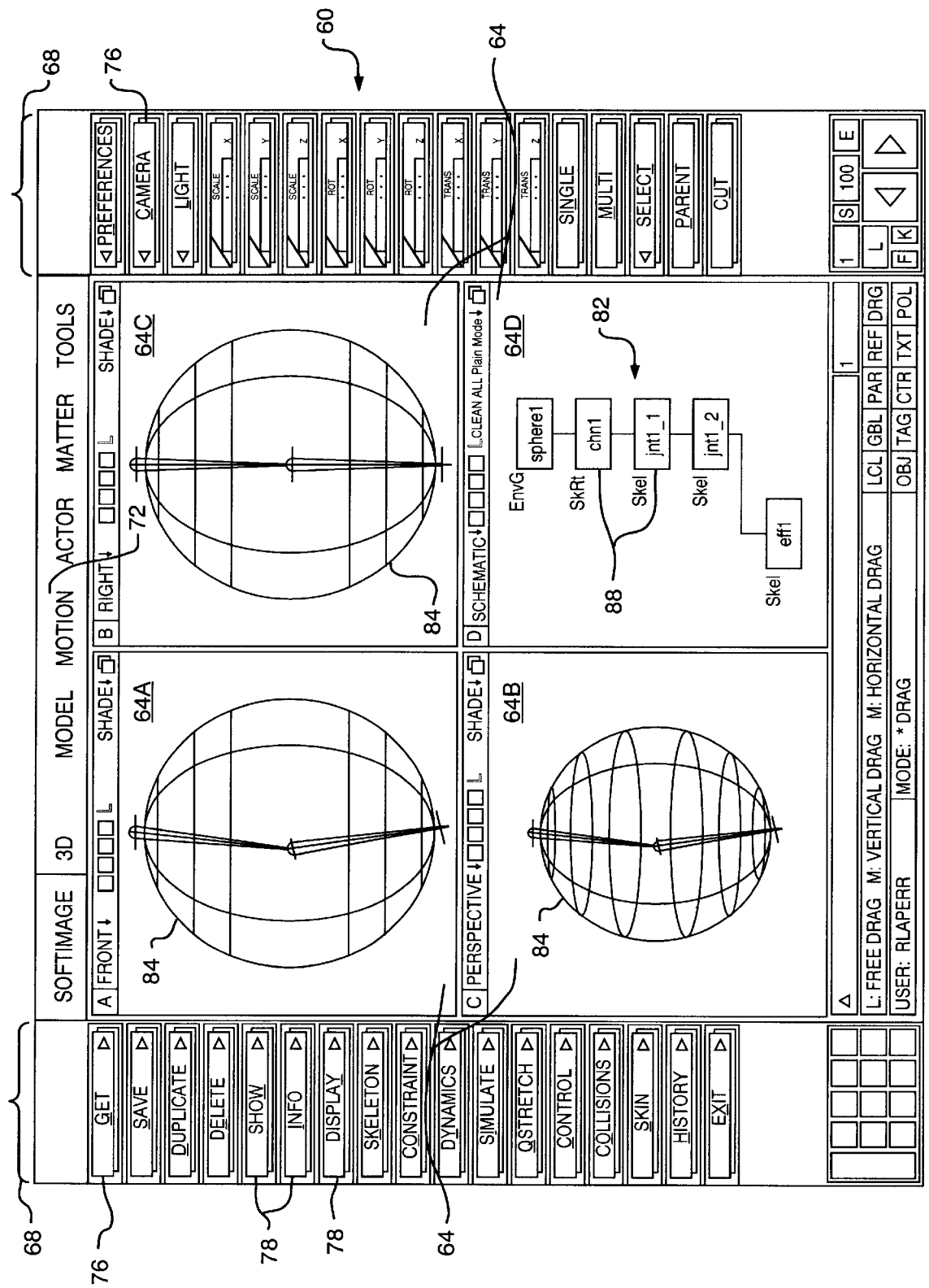
FIG. 2 shows a graphical user interface of the system in FIG. 1.

FIG. 2 shows a user interface 60 for a computer animation system. The particular interface shown in this example is that of the Softimage|3D V3.7, system discussed above, and this interface is shown merely as an example of such an interface and other interfaces, as will occur to those of skill in the art, can be employed without departing from the scope of the present invention.

As shown, interface 60 includes display windows 64 and function areas 68. The configuration, display mode and relative sizes of animation display windows 64 and function areas 68 are illustrative only, and can change according to a present operation mode of the system and/or can be modified, to at least some extent, by an animator or by any other suitable means. Function area 68 generally consists of a module bar 72 and toolbars 76 having buttons 78 which, as will be apparent, provide access to file management functions, animation functions and other functions available to the animator through the animation application software executing on computer 24. Display windows 64 include windows 64a, 64b and 64c showing front, perspective and right views respectively of an animation and a schematic window 80 which displays a schematic representation of the hierarchy 82 of objects in the scene.

Computer-generated animations generally consist of one, or more scenes. A scene, or a pan thereof, can be viewed in animation display windows 64. A scene consists of one or more objects 84 placed and organized within a space. Objects 84 are the basic building blocks of 3D computer animations. As used herein, the term "object" is intended to comprise any object or component of a 3D animation which can be positioned in three dimensions and an object can be a mathematical representation of shapes, figures, characters, etc., including wireframe, curve, surface, face, polygon mesh and meta-clay objects or a light source or camera (i.e.—rendering viewpoint).

A typical scene hierarchy 82 is shown in schematic view window 80 of FIG. 2 and represents the objects of a scene and their interrelationships. Complex 2D and 3D objects 84 can be formed of a number of individual components, or nodes 88, which are for the purposes of the present invention, also defined as objects. In the schematic view window 80 of the Figure, an articulated chain object "chn1" comprises two joint objects, "jnt1_1" and "jnt1_2" and an end effector object "eff1" to which an envelope object "sphere1" has been assigned.

As is well known computer-generated animation systems permit an animator to manipulate and modify an object 84 by operating upon parameters of the object 84. As used herein, the term parameter is intended to comprise properties, operators, effects, constraints, expressions, scripts and the like. Properties can include position, orientation and scaling, or a color or texture applied to the objects, etc.

As mentioned above, in known animation systems, the animator can select one or more objects, usually from a schematic or similar, view, and can "tag" that object or objects as a set. Once a tagged set has been created, the members of the set can be easily identified to allow the user To apply parameters such as expressions, constraints, textures, colors, scalings, rotations, etc. tag each member of the set of objects.

To date, membership in such sets has been static and to add or subtract objects in such a tagged set an animator must access the objects, again through a schematic or similar view, and make the appropriate changes to the membership of the set. Moreover, desired parameters must be explicitly applied to each member of a tagged set by the animator.

The present invention overcomes the limitations of prior art tagged sets by permitting an animator to define a dynamic group wherein the membership of objects in the group is determined according to a rule evaluated at appropriate intervals and each member of the group inherits the parameters, if any, defined for that group. Essentially, the animator defines a dynamic group by defining a membership rule for the group and can then, or subsequently, define one or more parameters to be applied to the group. These defined parameters are inherited by the objects which are members of the group. For convenience, it is also contemplated that the animator will assign a representative name to the group.

The animation system will evaluate the defined membership rule at appropriate intervals to determine changes in membership of the group. For example, when an animator is interacting wit a scene, the membership rule can be evaluated after each user interface event so that the results of any changes made by the animator are shown to the animator as they are made. When the animation is being rendered, the membership rule can be evaluated prior to the rendering of each frame of an animation. Objects, added to the membership of the group will inherit whatever parameters have been applied to the group and objects which have been removed from membership in the group will drop those defined parameters they previously rendered. Any new parameters which have been defined for the group will be propagated to the members and any parameters which have be removed from the group will be dropped by all members of the group.

Figure 3:
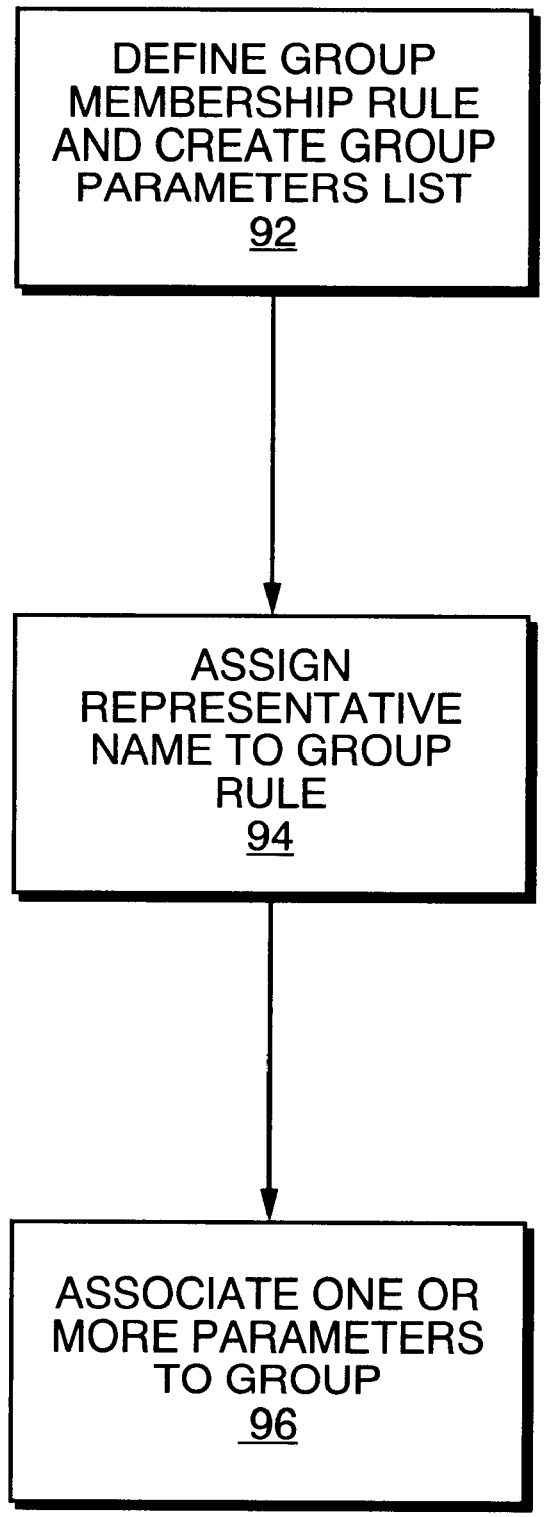
FIG. 3 shows a flow chart for defining a group in accordance with the present invention.

A flow chart of showing the steps of creating a group according to the present invention is shown in FIG. 3. The method commences at step 92 with the animator creating a membership rule which defines membership in a dynamic group. It is contemplated that this will be accomplished by the animator inputting information into a dialog box, properties tab, or other appropriate input mechanism for a scene or for an entire animation. If the animator wishes to subsequently modify the membership rule, step 92 can be re-performed as desired.

The membership rule is any function, expression, macro, script, program element or plug-in which returns a true or false value. For example, membership rules can be implemented in Microsoft Visual Basic for Applications, Softimage|3D plug-ins written in languages such as C++, etc. or any other suitable grammar employed by the animation system.

In a presently preferred embodiment of the invention, membership rule definition employs an expanded version of the expression grammar employed in the above-mentioned Softimage|3D V3.7 product, although any other suitable method of defining a membership rule can be employed, as will occur to those of skill in the art. Accordingly, the form of the boolean statement defining the rule is not particularly restricted and can, for example, take the form:

Function (Reference, This) Operator Value where "Function" takes "Reference" and "This" as arguments. "Reference" can be one or more explicitly identified objects, against which other objects are to be compared to determine group membership, or "Reference" can be another function or rule which returns a result. "This" refers to the particular object in the scene whose membership status is under consideration. "Operator" is any boolean operator putting in relation the result of Function and Value. "Value" is an argument, constant or variable, against which the result of "Function" is compared. The result of this comparison is True or False.

Once a membership rule, or rules, is defined, the animator can assign a representative name to the group at step 94. The assignment by the animator of a name to the group is optional, but it is contemplated that in most circumstances this will be found to be advantageous when the animator subsequently wishes to interact with the group, such as to apply or remove parameters to the group. At step 96, the animator can then, or at any subsequent time, apply or remove one or more parameters to the group as desired. As described below in more detail, each member of the group, if any, inherits each parameter applied to the group and each member of the group, if any, deletes any parameter subsequently removed from the group. Inherited parameters occlude any parameters defined for the object, referred to herein as "local parameters" and when an inherited parameter is removed from an object, any local parameters which was occluded by the inherited parameter will then be employed by the object.

Figure 4:
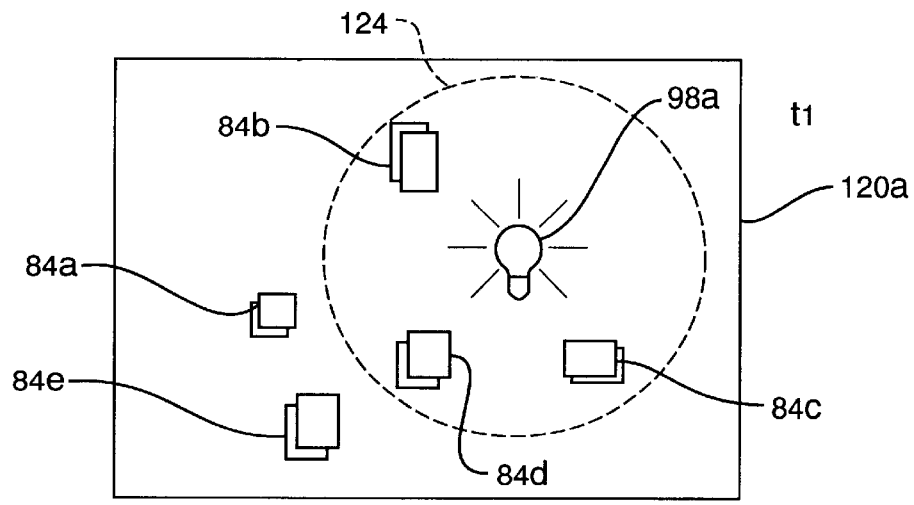
FIG. 4 shows a scene in an animation at a time t1.
Figure 5:
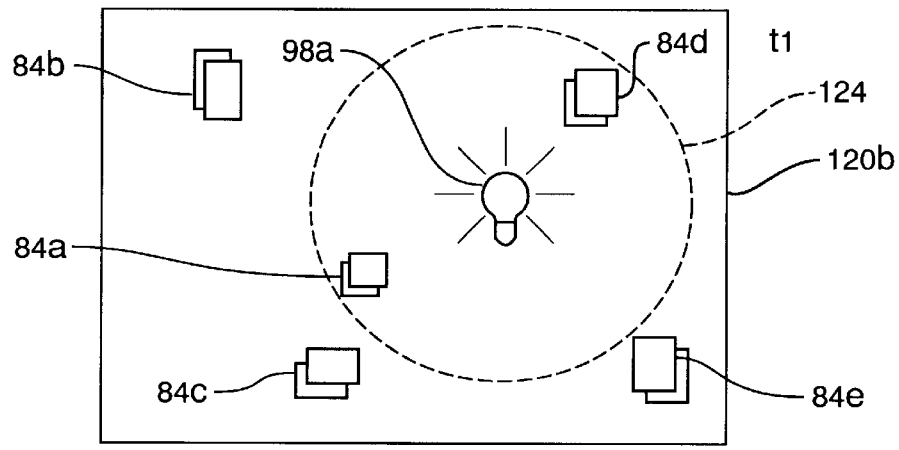
FIG. 5 shows the scene of FIG. 4 at a time t2.
Figure 6:
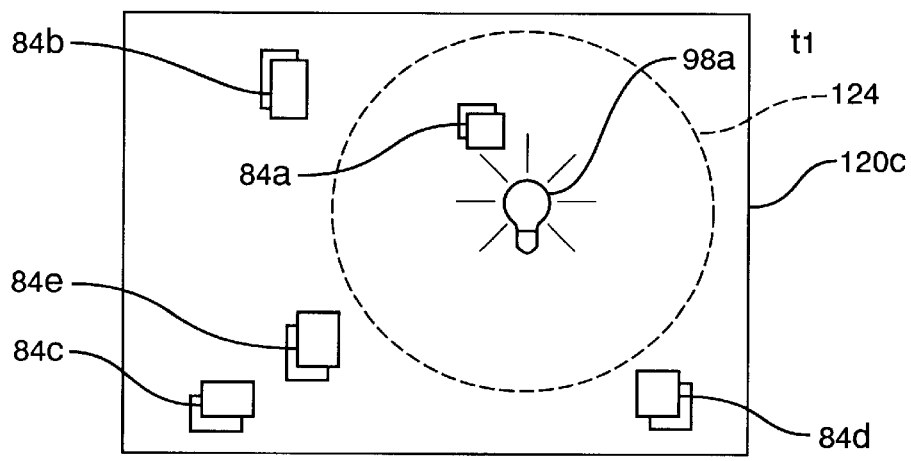
FIG. 6 shows the scene of FIG. 4 at a time t3.

FIGS. 4, 5 and 6 show a schematic representation of three different frames 120a, 120b and 120c of a scene at three times t1; t2; and t3, respectively. Each frame 120 contains animated objects 84a, 84b, 84c, 84d and 84e which are animated to move within the scene and a light object 98a which is motionless. The animator mating this scene desires that those objects 84 that are within 10 units of a light object 98a, as indicated by circle 124, in each of the frames 120a, 120b and 120c will have a highlight property applied To them. As shown, the positions of objects 84 change from frame to frame such that the particular objects 84 which am within 10 units of light object 98a change in each frame 120. As will be apparent to those of skill in the art, FIGS. 4, 5 and 6 are 2D representations of frames 120 but the present invention can, and often will, be employed with 3D animations. Any membership rule employed with the present invention can be defined in terms of 2D, 3D or other configurations.

In prior art animation systems, an animator would have to define a constraint, expression or the like, for each of the objects 84a, 84b, 84c, 84d and 84e to apply the highlighting property. More particularly, the animator must also identify my new objects which are subsequently added to the scene and define appropriate constraints for those objects too.

However, with the present invention, the animator can define a membership rule for a dynamic group for objects within ten units of the light 98a, as:

$$\text{dist(light, this)} < 10 \text{ \& this} = !\text{light}$$

where dist is a pre-defined function returning the distance between two objects. The animator can assign a representative name, such as "Highlighted by Light 1" to the group and the animator can assign the highlight property to this group. As will be apparent to those of skill in the art, the second part of the rule, i.e.—"this=!light", ensures that the light itself does not get included in the group.

At any time after a group tag been defined, an animator can modify the membership rule (i.e.—dist(light, this) <8&this=!light) and can add one or more parameters to the group and/or can remove or modify one or more parameters which have been added to the group. The animator will be presented with a list of defined group names, or default identifiers if no name has been defined by the animator, from which a group can be selected.

A list of parameters, if any, assigned to the selected group will be displayed and the animator can delete or modify assigned parameters and/or can select one or more additional/new parameters to be applied to members of the group from a list of available parameters. Further, the animator can define new expressions, in a conventional manner, which can be applied to members of the group as parameters.

In the example of FIGS. 4, 5 and 6, the animator could, for example, select "Highlight" from a list of available parameters to add it to the parameters applied to the group or the animator could modify the Highlight property, if already applied, to highlight the objects with a different colour from that previously defined as the highlight colour.

Determining group membership comprises evaluating each group's membership rule for each object in a scene. For each object for which a group membership rule is evaluated as True, the object is added to that group and inherits all of the parameters applied to that group. Inherited parameters occlude local parameters defined for each object and do not delete the local parameters. For example, if an object has a blue material and shading property defined locally for it and it becomes a member of a group with a red material property defined, the red material property is inherited by the object and occludes the local blue material property while the object is a member of the group. When the object is tag longer a member of the group, the red material property is dropped and the local blue material property will again be used.

In many circumstances, evaluation of membership rules and the inheritance or removal of parameters will be performed on a frame by frame basis, particularly when the animation is being rendered (i.e.—when a rerender event occurs). However, it is contemplated that if desired, specific intervals can be defined at which membership rules are processed. For processing efficiency purposes, it may in other circumstances be desired to forgo some accuracy and to only process membership rules every five or more frames, rather than for each frame. It is also contemplated that membership rules can include conditional evaluation terms if desired. For example, a membership rule can include a condition that it is not to be evaluated until after a specified tame has been rendered, or until anther event has occurred. In such a circumstance, the membership rule is evaluated to determine if the conditional term or terms are true.

Further, in circumstances wherein the animator Is interactively modifying the angulation, evaluation of the group membership rules can be performed after each modification or user interface event (i.e.—mouse click, etc.) so that the animation is updated immediately to reflect The effect of changes made by the animator (i.e.—when a rerender/redraw event occurs).

Figure 7:
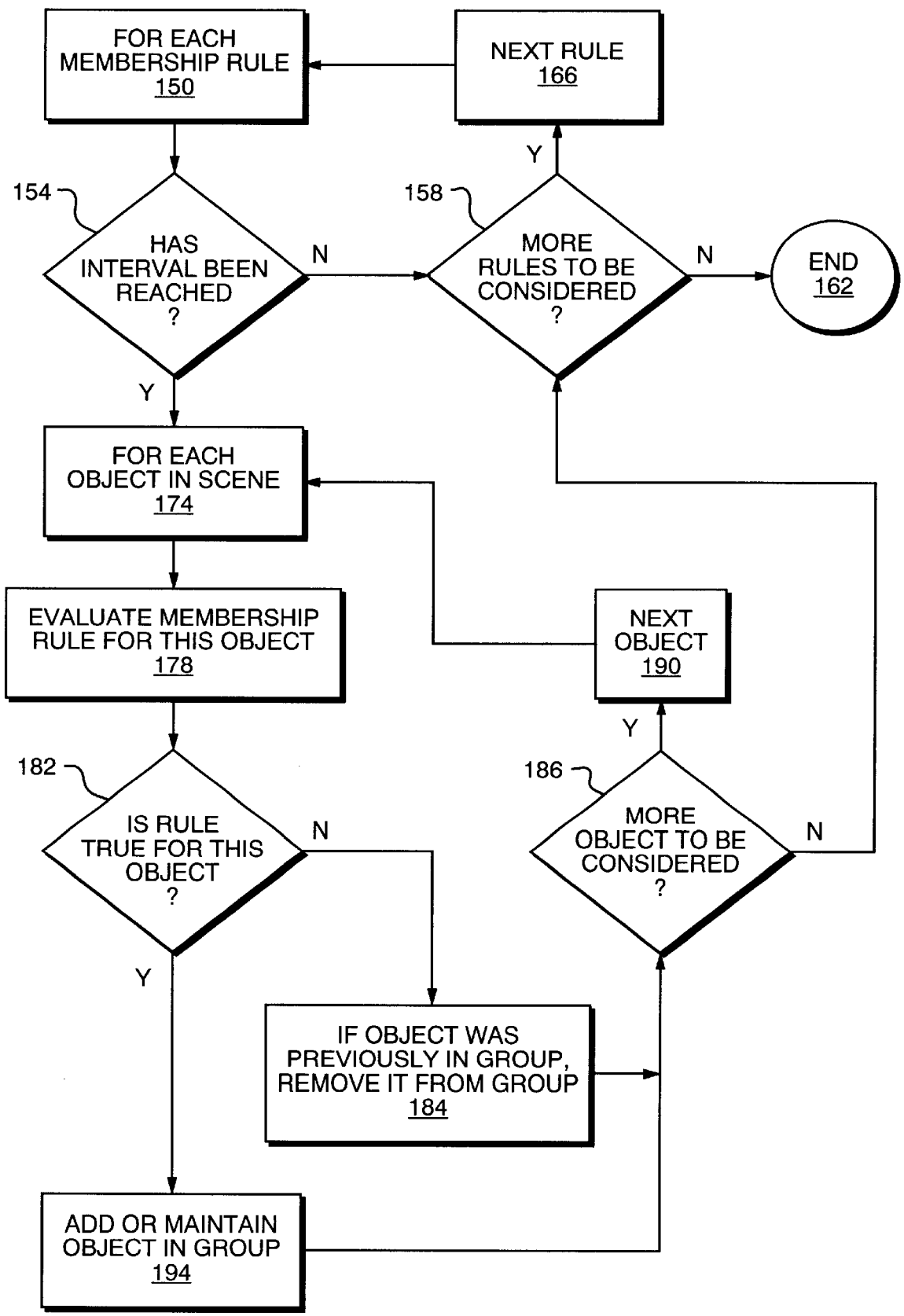
FIG. 7 shows a flow chart of a method employed in an embodiment of the present invention.

FIG. 7 shows a flow the representing an embodiment of the method of the present invention when an animation is executed. The method commences at step 150 wherein one of the defined membership rules is selected for consideration. At step 154, a determination is made as to whether the interval for the selected rule has been reached. In most circumstances, the interval will be reached at least for each frame of a scene, but it is contemplated that other, more or less frequent intervals, or conditional intervals can also be employed.

If, at step 154, it is determined that the interval for the selected rule has not been reached, a step 158 a determination is made as to whether any more member rules remain to be considered. If all membership have been considered, the method is terminated at step 162 and the scene is rendered accordingly and the method will recommence at step 150 at the next appropriate interval.

If at step 158 it is determined that one or more membership rules remain to be considered, another membership rule is selected for consideration at step 166 and the method continues at step 150.

If, at step 154, it is determined that the interval for the selected membership rule has been reached, at step 174 a first object is selected and at step 178 the membership rule for the selected group is evaluated for the selected object by substituting the selected object for the "This" in the rule.

At step 182 a determination is made as to whether the selected membership rule is true for the selected object. If the rule is False, the method continues at step 184 wherein the object is removed from the group, if it was previously in the group, and any parameters inherited by the objects from the group are removed. Any parameters of the object which were previously occluded by inherited group parameters are again employed by the object.

The method then proceeds to step 186 wherein a determination is made as to whether any more objects remain to be considered in the scene. If one or more objects do remain to be considered, the method selects the next object for consideration at step 190 and the method continues at step 174. If, at step 186, no more objects remain to be considered the method ends at step 162, as discussed above.

If, at step 182 it is determined that the membership rule is True for the selected objects the object is placed into the group, or is maintained in the group, at step 194 and the object inherits each parameter applied to the group for which the selected rule is defined. The method then continues at step 196 to determine if more objects remain to be considered.

In FIG. 4, objects 84*b*, 84*c* and 84*d* are within ten units of light object 98*a*, as indicated by circle 124 which is centered at light object 98*a* and which has a radius of ten units. As will be apparent to those of skill in the art, circle 124 is merely provided for the purposes of this discussion and would not appear in frames 120. Evaluation of the membership rule for the "Highlighted by Light 1" group would thus return a True value for each of objects 84*b*, 84*c* and 84*d* and would return a False for objects 84*a* and 84*e* which are more than ten units from light object 98*a*.

Once membership in the "Highlighted by Light 1" group is determined for an object, the objects meeting the membership rule are placed in the group and each object inherits each of the parameters associated with this group. Each other membership rule, if any, defined for the scene 120*a* is evaluated in a similar manner, in turn.

When all of the membership rules have been processed and scene 120*a* has been appropriately rendered, the rendering of the animation continues until the next predefined interval occurs. In scene 120*b*, which could be the next frame to be rendered or a frame which could occur at another selected interval, the process repeats after the objects are located at their new (animated or user defined) locations and/or any changes (animated or user defined) to their sizes, orientations, etc. have been applied. The membership rules are again evaluated for each object and object membership in the group or pups is determined. Each object inherits each parameter assigned to each group of which it is a member and drops any parameter or parameters which it has previously inherited from a group or groups of which it is no longer a member. In the example of FIG. 5, the result of the membership rule evaluation is that objects 84*a* and 84*d* are now members of the "Highlighted by Light 1" group and objects 84*b*, 84*c* and 84*e* are not. The highlight property is thus inherited by each member (objects 84*a* and 84*d*) of the group and previous members of the group (84*b* & 84*c*) tag drop the highlight property. The membership rule of the next group, if any, is then considered. When all of the membership rules have been defined and scene 120*b* has been appropriately rendered, the rendering of the animation continues until the next predefined interval occurs.

In scene 120*c*, which is the next selected interval, the membership rule for the "Highlighted by Light 1" group is again evaluated. As will be apparent, object 84*a* is now the only member of this group and it inherits the highlight property from this group while object 84*d* is no longer a member of the group and drops the highlight parameter it had previously inherited from the group.

The membership rule evaluation process continues throughout the rendering process, whenever one or more dynamic groups are defined for a scene or animation. As will be apparent to those of skill in the art, it can occur that one or more groups can have no objects as members and/or one or more groups can have all of the defined objects as members. In either case, the method of evaluating and membership is performed as described above and the group membership rules are maintained within the animation system for evaluation at each appropriate interval.

While the examples above have employed the distance between objects as the criteria in the membership rules, the present invention is not so limited and any other criteria available within the animation system can be employed, as will occur to those of skill in the art. Such other criteria include, without limitation, scaling, position, orientation; material, color, speed, and any other available or derivable information within the animation.

As will be apparent to those skilled in the art, the groups of the present invention provide an animator with a number of advantages over tagged sets. The animator can create a rule-based group which is automatically updated at animator-specified intervals. The animator does not have to explicitly determine which objects should be included in the group, nor does the animator have to explicitly update membership in the group to ensure tat all appropriate objects have been included. Only those objects which satisfy the membership rule or rules defined by the animator will be members of the groups at any a time.

While groups in accordance with the present can be used to develop complex, interactive animation effects where objects automatically react to the state of another object, the object itself (i.e.—its own position scale, etc.) or other condition, the present invention can also be employed by animators at a development stage to alert the animator to undesired states within the animation. For example, an animator animating a character model of a human being desires that all movement of the character look as realistic as possible. Therefore, the animator must avoid unnatural joint movements, such as over-rotation or flexure in the wrong direction. With the present invention, the animator can create a membership rule for the joint nodes or the character such that the rule evaluates as true for any joint node which is rotated outside a range of between 0 and 90 degrees, for example, with an evaluation interval of every frame, or interactively after every modification by the animator, and a parameter, such as "Highlight in Red", can be applied to the group defined by this rule. The animator then manipulates the character to, for instance, walk across a stage in a scene. The joint nodes are evaluated for membership in the group every frame, or interactively after every modification by the animator, and any joint nodes which are over-rotated or negatively rotated will be highlighted in red, thus alerting the animator to a potentially unrealistic joint movement.

The above-described embodiments of the invention are intended to be examples of the present invention and alterations and modifications may be effected thereto, by those of skill in the art, without departing from the scope of the invention which is defined solely by the claims appended hereto.

I claim:

1. A computer-implemented method of defining and using a group of animation objects for in an animation including at least one object, comprising the steps of:

(i) defining at least one membership rule for a group of animation objects, the at least one membership rule having a preselected user-defined evaluation time associated therewith and being characterized so as to dynamically determine, during the associated preselected time, animation object membership for the group;

(ii) defining at least one parameter for the group;

(iii) evaluating, at a preselected interval, the at least one membership rule for each object in the animation and placing each object which meets the at least one membership rule into the group and applying the at least one parameter to each object within the group dynamically determining the animation object membership by evaluating, at the preselected time, the at least one membership rule for each animation object for compliance with the rule, and dynamically associating complying ones of the animation objects with the group during the preselected time; and (iv) applying the at least one parameter to each said object associated with the group during the preselected time.

2. The method of claim 1 wherein said preselected time occurs after each user-modification of said animation.

3. The method of claim 1 wherein said preselected time corresponds to a frame in said animation.

4. The method of claim 1 further comprising the step of assigning an identifier to said membership rule.

5. The method of claim 4 wherein said identifier is a name.

6. The method of claim 1 wherein said at least one parameter comprises at least one of a property, operator, effect, constraint and script.

7. The method of claim 1 wherein mid membership rule is a function.

8. The method of claim 1 wherein said membership rule returns a Boolean value.

9. An animation system to define and use rules-based groups of animation objects in an animation produced therewith, the system comprising:

a storage device to score information defining animation objects and animation information relating thereto;

at least one output device display a graphical user interface to a user;

at least one user input device to receive input from a user, said input:

(a) defining at least one membership rule for a group of animation objects, the at least one membership rule having a preselected user-defined evaluation time associated therewith and being characterized so as to dynamically determine, during the associated preselected time, animation object membership for the group; and (b) defining at least one parameter for the group; and a computer operatively connected to said storage device, said output device and said user input device, said computer:

(i) determining when a preselected time has occurred for each said at least one membership rule for each group;

(ii) for each group, dynamically determining the animation object membership by evaluating, at the preselected time, the at least one membership rule for each animation object for compliance with the rule, and dynamically associating complying ones of the animation objects with the group during the preselected time;

(iii) applying the at least one parameter to each object associated with the group during the preselected time; and (iv) repeating steps (i) to (iii) for each said preselected time.

10. The system of claim 9 wherein said at least one user input device further receives from a group to define said preselected time.

11. The system of claim 9 wherein said at least one user input device further receives input from a user comprising an identifier to be associated with said at least one membership rule.

12. The system of claim 9 wherein said output device also displays to said user a list of said parameters available to be applied to each said group.

13. The system of claim 9 wherein said at least one user input device further receives input from a user to define said at least one parameter to be applied to each said animation object in a group.

14. The system of claim 9 wherein said preselected time occurs after each modification of said animation by a user.

15. The system of claim 9 wherein said membership rule is a function.

16. The system of claim 9 wherein said membership rule returns a Boolean value.

* * * * *